United States Patent [19]
Easter et al.

[11] Patent Number: 5,498,025
[45] Date of Patent: Mar. 12, 1996

[54] AIR BAG MODULE

[75] Inventors: Kenneth M. Easter, Dayton; John A. Lotspih, Englewood; Michael W. Donegan, Bellbrook, all of Ohio

[73] Assignee: General Motors Corporation, Detroit, Mich.

[21] Appl. No.: 482,959

[22] Filed: Jun. 15, 1995

Related U.S. Application Data

[63] Continuation of Ser. No. 233,187, Apr. 26, 1994, abandoned.

[51] Int. Cl.$^6$ ................................................. B60R 21/16
[52] U.S. Cl. ................................ 280/728.2; 280/732
[58] Field of Search ........................ 280/728.2, 728.1, 280/732, 731

[56] References Cited

U.S. PATENT DOCUMENTS

| | | |
|---|---|---|
| 4,941,678 | 7/1990 | Lauritzen et al. . |
| 5,069,480 | 12/1991 | Good . |
| 5,149,130 | 9/1992 | Wooley et al. . |
| 5,234,227 | 8/1993 | Webber ........................... 280/728 A |
| 5,263,739 | 11/1993 | Webber et al. . |
| 5,284,358 | 2/1994 | Rhein ............................. 280/728 A |
| 5,312,130 | 5/1994 | Baba ............................... 280/732 |
| 5,388,858 | 2/1995 | Cuevas ........................... 280/728 A |

*Primary Examiner*—Eric D. Culbreth
*Attorney, Agent, or Firm*—Kathryn A. Marra; Howard N. Conkey

[57] ABSTRACT

An air bag assembly includes an air bag module subassembly for installation in an air bag housing having a housing opening through which an air bag deploys. The air bag module subassembly includes a subassembly retainer which captures and holds an inflator and an air bag retainer in position relative to the housing and enables facile installation of the air bag module subassembly into the housing via the housing opening such that the subassembly retainer is restrained by the housing to prevent release of the air bag retainer.

13 Claims, 2 Drawing Sheets

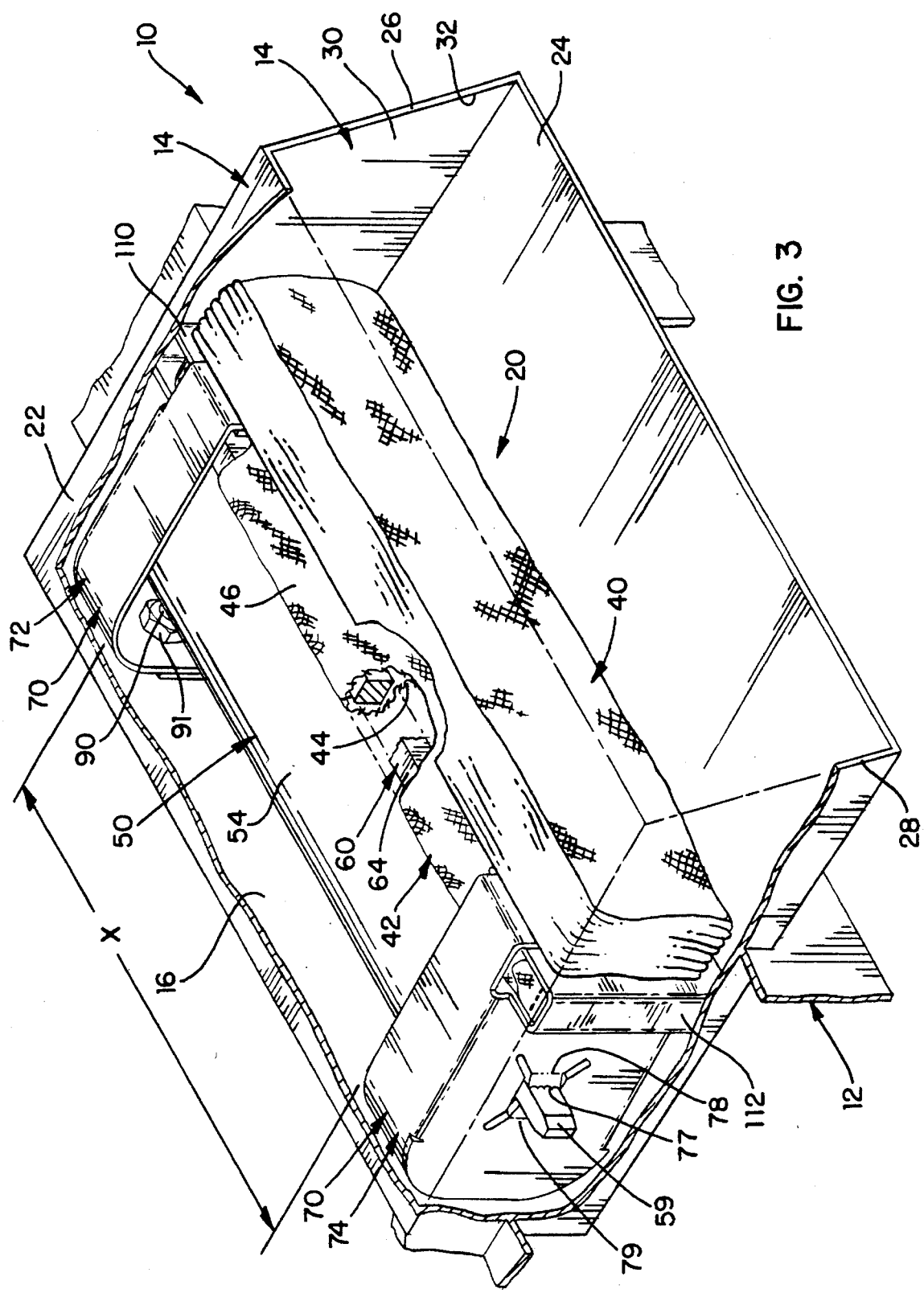

AIR BAG MODULE

This is a continuation of application Ser. No. 08/233187 filed on 26 Apr. 1994, abandoned.

This invention relates to an air bag assembly including an air bag module subassembly for installation in an air bag housing having a housing opening through which an air bag deploys. More particularly this invention is directed to an improved air bag module subassembly comprising a subassembly retainer which captures and holds an inflator and an air bag retainer in position relative to the housing.

BACKGROUND OF THE INVENTION

It is well known in motor vehicles to provide an air bag restraint system for protection of a vehicle occupant. The air bag restraint system includes an air bag module located beneath the surface of the instrument panel.

Air bag modules have been developed for assembly in a modular form. A common type of air bag module includes an inflator, a housing for holding the inflator and including an air bag deployment opening, and an air bag normally stored in a folded condition within the housing near the opening. The housing is normally made of sheet metal and, during vehicle assembly, the entire module is attached via the housing to the instrument panel support structure located beneath a cover door formed in or mounted on the upper or rearward surface of the instrument panel in front of a passenger seat.

The cushion is normally positioned atop the inflator near the opening in the housing, so that, upon the vehicle experiencing a predetermined change in velocity, the inflator discharges gas to inflate the air bag for deployment through the opening and for forcibly opening the cover door.

As an alternative to these modules, some vehicles are designed to incorporate the housing as an integral part of the instrument panel support structure. This enables the use of a simplified air bag module which does not include the housing. Such a simplified module in current use is known as a "soft pack" module and comprises an inflator, a skeletal inflator support and a restraint cushion which lies atop the inflator and is held in place by a cover.

The prior art includes simplified modules in which the inflator is directly connected to the housing by insertion through a side opening included in the housing. In other simplified modules, the inflator is operatively connected by a skeletal inflator support to the housing adjacent a bottom housing opening. These arrangements require that manufacturing operations be performed on the housing to provide either a side opening or a bottom opening to accommodate connection of the inflator to the housing. Access to perform these manufacturing operations can be difficult when the housing is provided as an integral part of the instrument panel support structure. In addition, assembly of the inflator to the integral housing via a side or bottom opening may be difficult due to limited access underneath the instrument panel support structure.

Thus, it would be desirable to provide an improved simplified air bag module subassembly which holds the inflator, which is subassembled independent of the housing and preferably without the use of fasteners, and which enables facile installation of the air bag module subassembly into the housing.

SUMMARY OF THE INVENTION

In accordance with the present invention, an air bag assembly includes an air bag housing having walls which define a contained housing interior and a housing opening. The air bag assembly also includes an air bag module subassembly which is located within the housing interior. The housing is preferably an integral part of the instrument panel support structure of a vehicle. Since the housing is part of the support structure, it is an object of this invention to provide an air bag module subassembly which is easily capable of subassembly independent of the housing such that the air bag module subassembly can be transported and later easily installed in the housing during vehicle assembly. In keeping with the spirit of the invention, it is a further object to have the inflator included as a part of the air bag module subassembly such that the inflator does not need to be held or supported by the housing or inserted in the housing separate from the air bag module subassembly. Thus, additional manufacturing operations typically performed on the housing to provide insertion access or support for the inflator are eliminated.

In the practice of this invention, the entire air bag module subassembly, including the inflator, is shaped for facile installation into the housing by unidirectional insertion of the air bag module through the housing opening. Thus, the same housing opening, which is easily accessible during vehicle assembly, is used for both air bag module subassembly installation and air bag deployment. This feature of the present invention minimizes the need for access underneath the instrument panel support structure during vehicle assembly.

Pursuant to the present invention, the air bag module subassembly includes an air bag for deployment through the housing opening, an inflator for generating gas to inflate the air bag, an air bag retainer secured to the air bag, and a subassembly retainer which captures the air bag retainer and inflator and holds them in position relative to the housing. It is also an object of this invention to have an air bag module subassembly which stays together as a subassembly independent of the housing. This is accomplished in the present invention by the subassembly retainer nonreleasably engaging either the air bag retainer or the inflator or both so that air bag retainer and inflator remain captured by the subassembly retainer.

In the present form of the invention, the subassembly retainer is a pair of spaced apart and opposing end supports which each engage a respective end of both the air bag retainer and inflator so that the air bag retainer and inflator are captured between the end supports. Additionally, either the air bag retainer or inflator or both are nonreleasably engaged by the end supports such that they remain captured between the end supports. The subassembly retainer also serves the purpose of holding the air bag retainer and inflator in position relative to the housing when the air bag module subassembly is installed in the housing.

In accordance with another aspect of the invention, the housing has walls, preferably including axially spaced apart end walls, which define a contained housing interior and a housing opening. During the application of forces associated with the inflator discharging pressurized gas and the air bag rapidly inflating, the air bag retainer must continue to remain captured by the subassembly retainer. The preferred embodiment of the present invention easily accomplishes this objective by the end supports of the subassembly retainer each proximately abutting the end walls of the housing interior such that movement of the end supports away from the air bag retainer is restrained to prevent release of the air bag retainer during air bag inflation.

The present invention is also concerned with eliminating the multiplicity of fasteners typically used in air bag modules. Accordingly, in a preferred embodiment of the invention, the end supports each include an insertion slot for slip-fitted engagement with a respective end of the air bag retainer to capture the air bag retainer therebetween without the use of fasteners. Additionally in this preferred embodiment, the air bag retainer is a mounting rod and the air bag has a mounting hem portion including a hem loop which contains the mounting rod, and the insertion slots of the end supports trap the hem portion on the mounting rod to prevent removal of the air bag from the mounting rod without the use of fasteners. Also in the preferred form of the invention, each of the end supports includes an aperture adapted for interference-fitted engagement with a respective end of the inflator to nonreleasably capture the inflator between the end supports without the use of fasteners.

The preferred embodiment is characterized by an air bag module subassembly, including a subassembly retainer which captures the air bag retainer and inflator to hold them in position relative to the housing. The air bag module subassembly is easily subassembled independent of the housing and is shaped to enable facile installation of the air bag module subassembly into the housing by unidirectional insertion via the housing opening. The subassembly retainer is restrained by the housing to prevent release of the air bag retainer. Additional features of the preferred embodiment enable subassembly of the entire air bag module subassembly without the use of fasteners.

BRIEF DESCRIPTION OF THE DRAWINGS

These and other features, objects, and advantages of the present invention will become apparent upon consideration of the following description of the preferred embodiment, appended claims, and accompanying drawings in which:

FIG. 3 is view similar to FIG. 1 showing an air bag assembly including the housing and air bag module subassembly in the assembled condition, and showing the housing, the air bag, and the air bag retainer partially-broken-away.

DESCRIPTION OF THE PREFERRED EMBODIMENT

Figure 1:
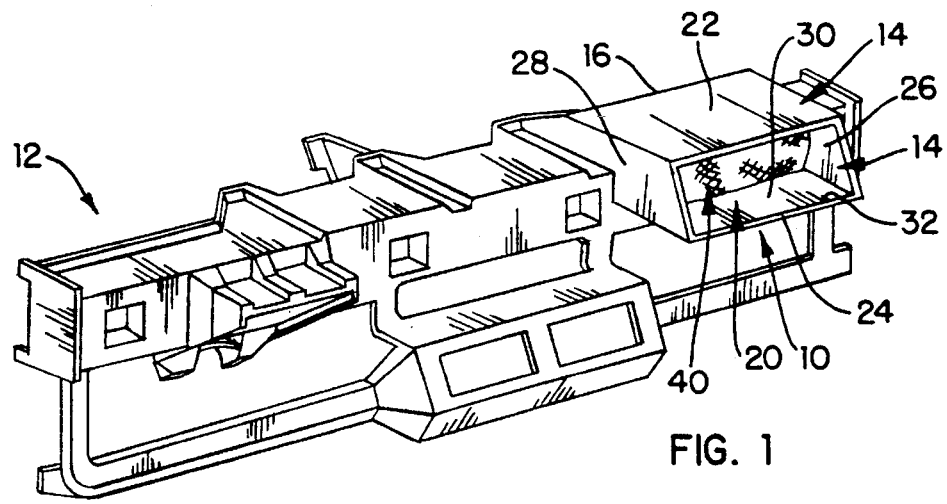
FIG. 1 is a rear perspective view of an instrument panel support structure having an integral housing.
Figure 2:
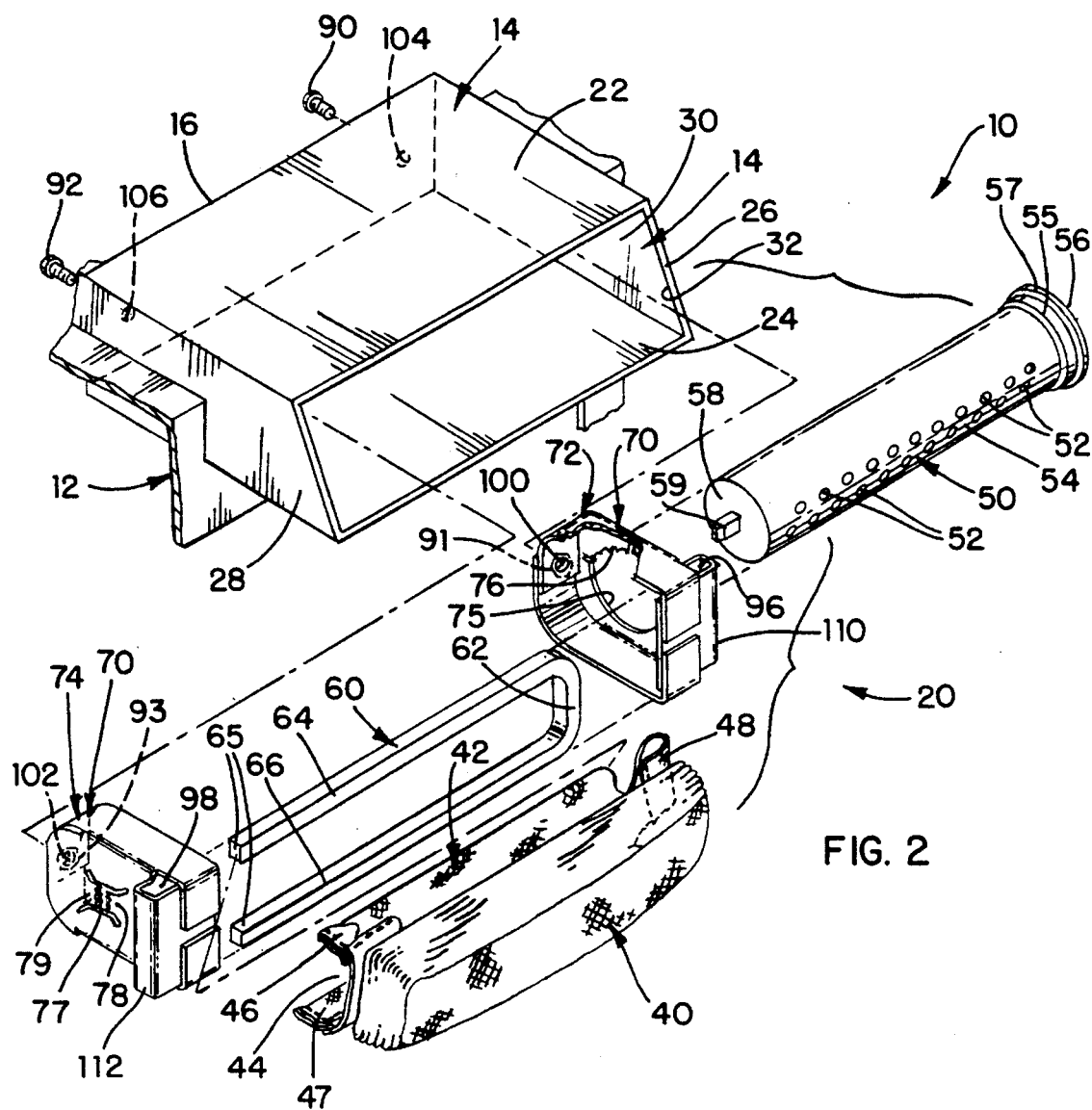
FIG. 2 is a view similar to FIG. 1 showing the housing partially-broken-away and further including an exploded rear perspective view of an air bag module subassembly.

Referring to FIG. 1, it is seen that a passenger vehicle includes an instrument panel support structure 12 preferably being a single magnesium casting. Referring to FIGS. 1 and 2, the instrument panel support structure 12 includes an integral air bag housing 14 including a forward wall 16 connected to spaced apart opposed top and bottom side walls 22, 24 and right and left end walls 26, 28. The walls 22, 24, 26, 28 cooperatively define a contained housing interior 30. The contained housing interior 30 is a substantially enclosed volume except for right and left mounting apertures 104, 106 and a rearward housing opening 32 cooperatively defined by the side and end walls 22, 24, 26, 28.

FIG. 2 illustrates the component parts of a complete air bag assembly, generally designated as 10. The component parts include the air bag housing 14 and an air bag module subassembly generally designated as 20. The module 20 is a simplified or so-called "soft-pack" module designed for installation into vehicle structure which incorporates the housing 14 as an integral part of the instrument panel support structure 12. The component parts of the module 20 include an air bag 40, an inflator 50 for generating gas to inflate the air bag 40, an air bag retainer 60 secured to the air bag 40, and a subassembly retainer 70 comprised of right and left end supports 72, 74 for holding the air bag retainer 60 and inflator 50 in position relative to the housing 14. The air bag assembly 10 also includes right and left fasteners, 90, 92 for securing the subassembly retainer 70 to the housing 14.

As best shown in FIGS. 1 and 2, the air bag 40 is generally of a conventional construction and is normally stored in a folded condition within the housing 14 near the housing opening 32. The air bag 40 includes a mounting hem portion 42 located around the periphery of an air bag mouth portion 44. The mounting hem portion 42 is here sewn into top and bottom hem loops 46, 47 and an end hem loop 48.

As best shown in FIG. 2, air bag retainer 60 is a U-shaped mounting rod comprising an end segment 62 connecting a top segment 64 and a bottom segment 66, and including an open end 65 opposite the end segment 62. In the present form of the invention, the air bag retainer 60 is made of steel or aluminum material and has a constant rectangular cross section. The cross section of the air bag retainer 60 is sized for slip-fitted radial insertion through the hem loops 46, 47, 48 of the air bag 40. Referring to FIG. 3, the top, bottom, and end segments 62, 64, 66 of the air bag retainer 60 are contained substantially within the top, bottom and side hem loops, 46, 47, 48 respectively, so that the air bag 40 is secured to the air bag retainer 60.

As best shown in FIG. 2, the inflator 50 may be of any conventional construction which contains chemicals for igniting to generate gas for discharge, such as through ports 52 in its main elongated cylindrical portion 54. Inflator 50 includes a collar portion 55 having a diameter greater than the main cylindrical portion 54 and an end cap 56 which has an enlarged flange 57 with a diameter greater than the collar 55. The inflator 50 includes an integral end portion 58 having the same outside diameter as the main cylindrical portion 54 and mounting a central orientation lug 59.

As best shown in FIGS. 2 and 3, the subassembly retainer 70 is located within the housing 14 and includes right and left end supports 72, 74 each preferably being a single metal stamping shaped by bending. The right and left end supports 72, 74 are axially spaced apart a predetermined distance X such that right and left outermost surfaces 110, 112 of right and left end supports 72, 74, respectively, proximately abut the right and left end walls 26, 28, respectively. Thus, it will be appreciated that the right and left end walls 26, 28 are axially spaced apart to fit the overall axial dimension of the module 20 therebetween.

Referring to FIGS. 2 and 3, the right and left end supports 72, 74 of the subassembly retainer 70 cooperatively capture the inflator 50 therebetween and hold the inflator 50 in position relative to the housing 14, as will now be described.

The right end support 72 includes an inflator opening 75, preferably including serrated edges 76. The inflator opening 75 nonreleasably engages the collar 55 of the inflator 50 by interference-fitted engagement therewith. The inflator opening 75 is appropriately sized such that the cylindrical portion 54 of the inflator 50 may be inserted therethrough and such that the flange 57 of the end cap 56 is prevented from insertion.

The left end support 74 includes an orientation notch 77, preferably including serrated tabs 78, 79, and configured to nonreleasably engage the inflator orientation lug 59 therein by interference-fitted engagement therewith such that tabs 78, 79 are biased against the lug 59 to prevent inflator 50 rotation relative the end supports 72, 74 and to prevent axial removal of the inflator 50.

The right and left supports 72, 74 further include rearwardly located right and left insertion slots 96, 98 each engaging a respective end of the air bag retainer 60 therein by slip-fitted connection therewith such that the air bag retainer 60 is captured between the end supports 72, 74 and is held in position relative to the housing 14. More specifically, the end segment 62 of the air bag retainer 60 is captured in the right insertion slot 96, while the opposing open end 65 of the air bag retainer 60 is captured in the left insertion slot 98. The air bag retainer 60 and hem loops 46, 47, 48 are trapped between the end supports 72, 74 such that radial removal of the air bag 40 from the air bag retainer 60 is prevented.

As shown in FIG. 2, the forwardmost surfaces of the right and left end supports 72, 74 each further include a right and left centrally located aperture 100, 102, respectively, for matably aligning with right and left mounting apertures 104, 106 on the forward wall 16 of the housing 14 for receiving right and left fasteners, such as bolts 90, 92, respectively, therethrough, to secure the subassembly retainer 70 to the housing 14. As best shown in FIG. 3, the bolts 90, 92 may, for example, be connected to right and left mating nuts 91, 93, respectively, which may preferably be pre-welded to right and left end supports 72, 74, respectively.

The entire module 20 is subassembled independent of the housing 14 and shaped for unidirectional slip-fitted insertion into the housing interior 30 via the housing opening 32. When module 20 is fully inserted, the end supports 72, 74 abut the forward wall 16 of the housing 14 such that the module 20 is located within the housing 14. The right and left outermost surfaces 110, 112 of right and left end supports 72, 74, respectively, proximately abut the right and left end walls 26, 28, respectively, to restrain outward axial movement of the end supports 72, 74 and to prevent release of the air bag retainer 60 from the subassembly retainer 70 during air bag 40 inflation.

Referring now to FIGS. 2 and 3, subassembly of the module 20, independent of the housing, will now be described.

Referring to FIG. 2, the module 20 is assembled as follows. To secure the air bag 20 to the air bag retainer 60, the air bag retainer 60 is radially inserted through the hem loops 46, 47, 48 in the air bag 40 until the top, bottom, and end segments 62, 64, 66 of the air bag retainer 60 are contained substantially within the top, bottom and side hem loops, 46, 47, 48, respectively.

To assemble the air bag retainer 60 to the end supports 72, 74 of the inflator retainer 70, the end segment 62 of the air bag retainer 60 is slid into the right insertion slot 96, and the opposite open end 65 is slid into the left insertion slot 98 such that the air bag retainer 60 is captured between the end supports 72, 74 and held in position relative to the housing 14 without the use of fasteners. Thus, the air bag retainer 60 extends axially between the end supports 72, 74 and the hem loops 46, 47, 48 are trapped on the air bag retainer 60 by the end supports 72, 74 such that radial removal of the air bag 40 is prevented without the use of fasteners. Furthermore, the air bag retainer 60 defines and maintains a predetermined axially spaced apart distance between the end supports 72, 74 such that the axial distance between the outermost surfaces 110, 112 is preferably slightly less than the axial spacing between the end walls 26, 28 in the housing interior 30. This predetermined axial spacing ensures that when module 20 is inserted into the housing 14, the right and left end supports 72, 74 proximately abut the right and left end walls 26, 28, respectively, so that outward axial movement of the end supports 72, 74 is prevented.

To facilitate subassembly of the module 20, it will be appreciated that the folded air bag 40 may be temporarily secured in the folded condition, such as by a surrounding flexible band (not shown). In addition, the end supports 72, 74 may be held in a stationary fixture (not shown) after capturing the air bag retainer 60 therebetween to temporarily assist in maintaining the predetermined axially spaced apart distance X between the end supports 72, 74 until subsequent insertion of the inflator 50.

The inflator 50 is assembled to the end supports 72, 74 as follows. The inflator 50 is axially inserted endwise, with the orientation lug 59 leading, through the inflator opening 75 in the right end support 72 until the inflator opening 75 nonreleasably engages the collar 55 of the inflator 50 and the notch 77 on the left end support 74 nonreleasably engages the orientation lug 59 on the inflator 50. After the inflator 50 is assembled to the end supports 72, 74, the inflator 50 and the air bag retainer 60 are nonreleasably captured between the end supports 72, 74 by interference-fitted connection of the end supports 72, 74 with the inflator 50.

It will be appreciated that the module 20 is sufficiently sturdy for storage or transport to a vehicle assembly location for subsequent insertion into the housing 14. Furthermore, the entire module 20, as described in this preferred embodiment, is assembled without the use of fasteners.

Completion of the air bag assembly 10 including installation of the module 20 in the housing 14 is easily completed as follows with reference to FIGS. 1, 2 and 3. The entire module 20 is slip-fittedly inserted into the housing interior 30 by unidirectional insertion in a generally forward direction via the rearward housing opening 32. In the assembled condition, the outermost surfaces of the right and left end supports 72, 74 are proximately abutting the right and left end walls 26, 28, respectively, within the housing interior 30. Also in the assembled condition, the inflator 50 extends axially between the end supports 72, 74 and is held in position relative to the housing 14, yet independent of the housing, by the end supports 72, 74.

To secure the module 20 to the housing 14, right and left fasteners 90, 92 are inserted through mounting apertures 104, 106 in the housing 14 and through right and left apertures 100, 102 in the right and left end supports 72, 74 to mate with right and left nuts 91, 93 to attach the subassembly retainer 70 to the housing 14.

Upon actuation, the inflator 50 discharges inflator gas. The contained housing interior 30 and the ports 52 of the inflator 50 direct the discharging inflator gas rearwardly out of the housing opening 32 and into the mouth portion 44 to inflate the air bag 40, which will deploy out through the housing opening 32 in a well-known manner. During the application of the forces associated with air bag 40 inflation, the end supports 72, 74 are restrained from outward axial movement by the end walls 26, 28 of the housing 14 such that the air bag retainer 60 remains captured by the end supports 72, 74 during air bag 40 inflation.

Since only two fasteners 90, 92 are required in the entire air bag assembly 10 and since the module 20 is unidirectionally inserted into the housing interior 30 via the housing opening 14, it will be appreciated that minimal access is required underneath the instrument panel support structure 12, thus enabling facile installation of the module 20 into the housing 14.

Since the inflator 50 is held within the housing interior 30 and positioned relative the housing 14 entirely by the subassembly retainer 70, and since the housing opening 32 serves as both an air bag deployment opening and an access opening for insertion of the entire module 20, manufacturing operations typically performed on the housing 14 for holding and inserting the inflator 50 are eliminated.

While the present invention has been described as carried out in a specific embodiment thereof, it is not intended to be limited thereby but is intended to cover the invention broadly within the scope and spirit of the appended claims.

We claim:

1. A method of assembling an air bag assembly which includes a housing having walls defining a contained housing interior and a rearward housing opening through which an air bag deploys, and an air bag module subassembly comprising an air bag, an inflator, an air bag retainer, and a subassembly retainer comprising a pair of axially spaced apart end supports each including an insertion slot, comprising the steps of:

a. securing the air bag to the air bag retainer, b. axially capturing the air bag retainer between the end supports by sliding opposing ends of the air bag retainer into respective insertion slots of the end supports, c. nonreleasably capturing the inflator between the end supports to form the air bag module subassembly, d. inserting the air bag module subassembly into the housing by forwardly unidirectional insertion therein via the housing opening such that said end supports proximately abut the housing interior thereby restraining movement of the end supports relative the air bag retainer to prevent release of the air bag retainer, and e. securing the subassembly retainer to the housing.

2. An air bag assembly comprising:

an air bag housing defining a contained housing interior, the housing having a rearward housing opening and axially spaced apart opposing end walls; and an air bag module subassembly for forwardly unidirectional insertion into the housing via the housing opening, the air bag module subassembly including an air bag for deployment through the housing opening, first and second opposing end supports being separate and independent from each other and being axially spaced apart, the first and second end supports each proximately abutting the respective end walls of the housing when the air bag module subassembly is inserted in the housing to restrain outward axial movement of the end supports away from each other, the first and second end supports each having an axially inwardly facing insertion slot therein, and an axially elongated air bag retainer secured to the air bag and having a first end seated in the insertion slot of the first end support and having a second end seated in the insertion slot of the second end support such that the air bag retainer is axially captured between the first and second end supports and held in position relative to the housing thereby.

3. The air bag assembly of claim 2 wherein the air bag module subassembly includes an inflator for generating gas to inflate the air bag, the inflator being nonreleasably captured between the first and second end supports to prevent axial movement of the end supports relative to each other prior to insertion of the air bag module subassembly into the housing.

4. The air bag assembly of claim 2 wherein the first and second end supports each include a forwardmost portion spaced apart forward of the insertion slots, the forwardmost portions being secured to the housing after insertion of the air bag module subassembly therein to prevent removal of the air bag module subassembly out through the housing opening during air bag inflation.

5. The air bag assembly of claim 2 wherein the air bag module subassembly includes an axially elongated inflator for generating inflator gas to inflate the air bag, the inflator having opposing inflator ends each engaging one of the first and second end supports, the end supports axially capturing the inflator therebetween to hold the inflator in position relative the housing.

6. The air bag assembly of claim 2 wherein the insertion slots of the first and second end supports are each defined by spaced apart opposing forward and rearward surfaces connected by an axially outward outermost surface and wherein the outermost surfaces of each of the insertion slots each proximately abut respective opposing end walls of the housing to restrain outward axial movement of the end supports away from each other during air bag inflation.

7. The air bag assembly of claim 2 wherein the insertion slots are each defined by spaced apart opposing forward and rearward surfaces integrally formed on each of the end supports and wherein the air bag retainer is captured between the forward and rearward surfaces of the insertion slots to restrain the air bag retainer from rearward and forward movement relative the housing when the air bag module subassembly is inserted in the housing.

8. The air bag assembly of claim 2 wherein the air bag module subassembly includes an inflator for generating gas to inflate the air bag and wherein each of the end supports nonreleasably engages at least one of the air bag retainer and inflator so that the air bag retainer and inflator remain axially captured between the end supports prior to insertion of the air bag module subassembly into the housing.

9. The air bag assembly of claim 2 wherein the end supports are each independently formed as a single integral piece.

10. An air bag assembly comprising:

an air bag housing defining a contained housing interior, the housing having a rearward housing opening and axially spaced apart opposing end walls; and an air bag module subassembly for forwardly unidirectional insertion into the housing via the housing opening, the air bag module subassembly including an air bag for deployment through the housing opening, first and second opposing end supports being independent and separate from each other and being axially spaced apart, the end supports each including an axially inwardly facing insertion slot defined by spaced apart opposed forward and rearward surfaces connected by an axially outward outermost surface, the outermost surfaces each proximately abutting respective opposing end walls of the housing when the air bag module subassembly is inserted into the housing to restrain outward axial movement of the end supports away from each other, and an axially elongated air bag retainer secured to the air bag and having a first end seated in the insertion slot of the first end support by slip-fitted axial insertion therein and having an opposite second end seated in the insertion slot of the second end support by slip-fitted axial insertion therein such that the air bag retainer is axially captured between the outermost surfaces of the insertion slots to prevent axial movement of the air bag retainer and is captured between the forward and rearward surfaces of the insertion slots to prevent forward and rearward movement of the air bag retainer whereby the end supports hold the air bag retainer in position relative the housing.

11. The air bag assembly of claim 10 wherein the air bag module subassembly includes an inflator for generating gas to inflate the air bag, the inflator being axially captured between the end supports to hold the inflator in position relative to the housing when the air bag module subassembly is inserted in the housing.

12. The air bag assembly of claim 11 wherein the end supports each nonreleasably engage at least one of the air bag retainer and inflator so that the air bag retainer and inflator remain captured by the end supports prior to insertion of the air bag module subassembly into the housing.

13. The air bag module of claim 11 wherein the end supports are each independently formed as a single integral piece.

* * * * *